United States Patent [19]

Bradford et al.

[11] 4,298,557

[45] Nov. 3, 1981

[54] METHOD AND APPARATUS FOR THE PREPARATION OF FOAMED STRUCTURES

[75] Inventors: Larry L. Bradford; David R. Jordan; Kenneth W. Williams, all of Lake Jackson, Tex.

[73] Assignee: The Dow Chemical Company, Midland, Mich.

[21] Appl. No.: 140,324

[22] Filed: Apr. 14, 1980

Related U.S. Application Data

[63] Continuation-in-part of Ser. No. 102,681, Dec. 12, 1979, abandoned.

[51] Int. Cl.³ .............................................. B29D 27/04
[52] U.S. Cl. ..................................... 264/51; 264/216; 264/DIG. 84; 425/89; 425/224; 425/817 C
[58] Field of Search ................... 264/51, 54, DIG. 84, 264/216; 425/89, 224, 817 C

[56] References Cited

U.S. PATENT DOCUMENTS

| | | | |
|---|---|---|---|
| 3,786,122 | 1/1974 | Berg | 264/54 X |
| 4,074,960 | 2/1978 | Dockray et al. | 264/DIG. 84 |
| 4,165,211 | 8/1979 | Eberling et al. | 264/DIG. 84 |

*Primary Examiner*—Philip Anderson
*Attorney, Agent, or Firm*—R. B. Ingraham

[57] ABSTRACT

In the preparation of polyurethane foam by the provision of foamable urethane composition to a trough and subsequent overflow of the trough to a conveyor belt for final foaming and curing of the urethane composition, improved product is obtained by maintaining temperature uniformity laterally across the trough.

8 Claims, 12 Drawing Figures

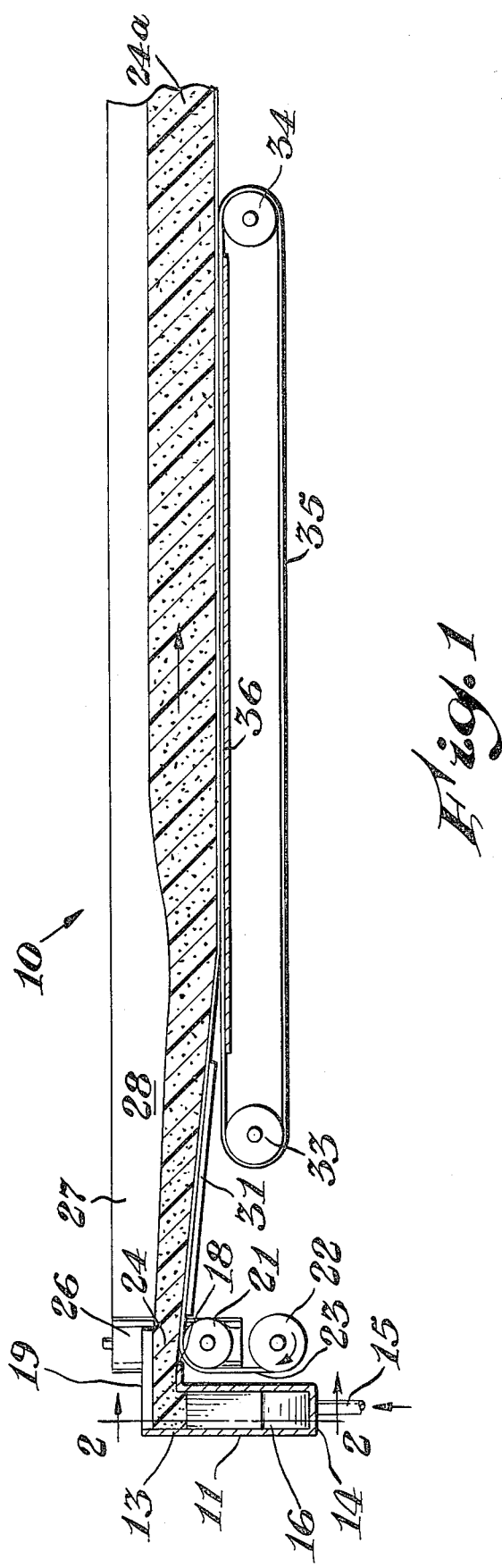
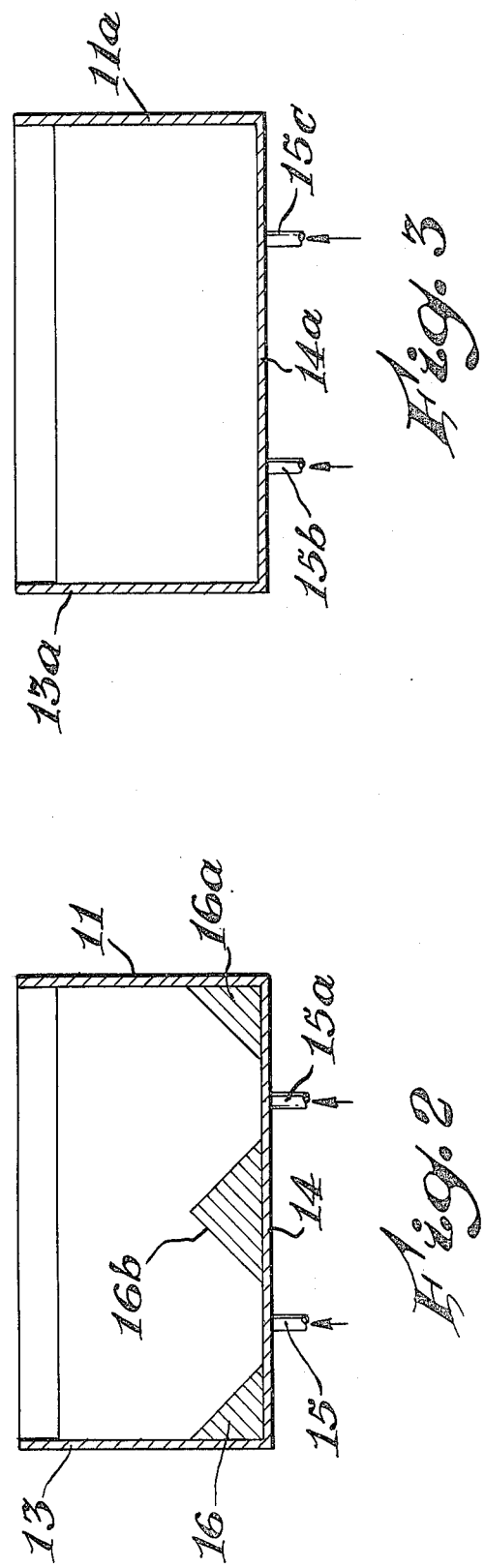

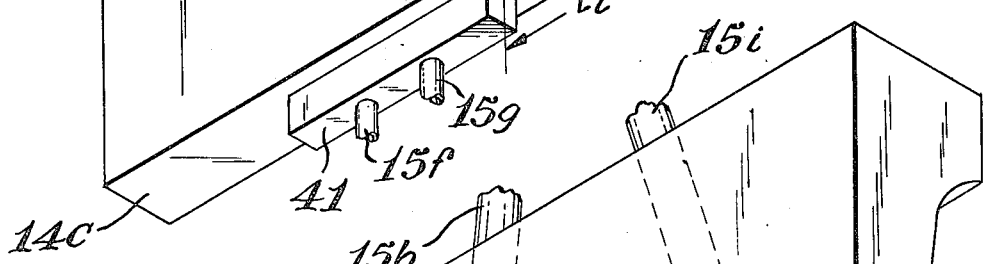

METHOD AND APPARATUS FOR THE PREPARATION OF FOAMED STRUCTURES

This application is a continuation-in-part of the copending application Ser. No. 102,681, filed Dec. 12, 1979 now abandoned.

A wide variety of foams are prepared by the admixture of various liquid components, some of which at least react exothermally to provide a cellular structure. A particularly desirable variety of such foams are the so-called flexible polyurethane foams. Preparation of such foam is well known in the art and is set forth in U.S. Pat. Nos. 3,325,823, 3,786,122, 3,832,099, 4,074,960 and 4,158,535, the teachings of which are herewith incorporated by reference thereto. In many instances, such foams are prepared on a commercial basis by the admixture of various liquid and occasionally one or more solid components, the resultant partially-foamed liquid mixture deposited on a moving belt, oftentimes an open topped trough having two sides and a bottom, the foam expanding and curing within the trough, and the resultant foamed billet cut into desired slabs generally of rectangular configuration. It can be readily seen that any deviation from a rectangular configuration can result in the generation of waste or scrap foam which represents an economic loss to the foam manufacturer. One particularly desirable method for the manufacture of flexible polyurethane foams involves the deposition of a foaming mixture into an open topped trough directly onto a moving substrate such as a belt or paper trough formed from 1 to 3 sheets. The use of such a trough eliminates the need for more complex foamable composition deposition heads or apparatus such as a movable orifice distribution system or a traversing distribution head. Generally, such a trough is of rectangular configuration. The trough has its major dimension disposed generally normally to the longitudinal axis of the foam being produced and is fed at one or more locations. Such an apparatus and the corresponding method for the preparation of foam has a significant advantage in the mechanical simplicity and lack of moving parts of the feed system immediately adjacent the moving trough. However, undesirable nonuniformities have been observed which result in undesired and uneconomical scrap.

It would be desirable if there were available an improved method for the preparation of polyurethane foam using a trough to supply foamable urethane material to a moving belt which would reduce the nonuniformities in the resultant foam.

It would be desirable if there were available an improved apparatus for the preparation of polyurethane foam.

It would also be desirable if there were available an improved method and apparatus for the preparation of polyurethane foam having reduced surface defects with minimal alteration to known method and apparatus.

These benefits and other advantages in accordance with the present invention are achieved in a method for the preparation of flexible polyurethane foam wherein a urethane foam forming mixture is provided, passing said mixture to a dispensing trough wherein partial foaming takes place, the dispensing trough discharging to a moving trough wherein the foam forming mixture expands and cures to form a flexible polyurethane foam, the improvement which comprises maintaining a generally uniform temperature across the mixture as the mixture passes from the dispensing trough to the moving trough.

Also contemplated within the scope of the present invention is an improvement in an apparatus for the preparation of flexible polyurethane foam, the apparatus comprising in cooperative combination means to supply a foamable foam forming mixture of polyurethane components to a dispensing trough wherein the foam forming mixture partially foams and is discharged to an open topped moving trough wherein the foaming mixture forms and cures to a flexible polyurethane foam, the improvement which comprises a means to provide a generally uniform temperature along a cross sectional configuration of the foaming mixture as the mixture passes to the moving trough.

Further features and advantages of the present invention will become more apparent from the following specification taken in connection with the drawing wherein:

FIG. 1 depicts a sectional view of an apparatus in accordance with the invention in the practice of the method of the invention;

FIG. 2 is a sectional view of the feed trough of the apparatus of FIG. 1 taken along the line 2—2 thereof;

FIG. 3 depicts a similar sectional view of a feed trough in accordance with the prior art;

FIG. 4 is a schematic view of a feed trough having two inlet ports and various dimensions thereof;

FIG. 5 is a schematic view of a feed trough with modified bottom inlets;

FIG. 6 is a schematic representation of a feed trough having vertically downwardly disposed inlets;

Figure 7:
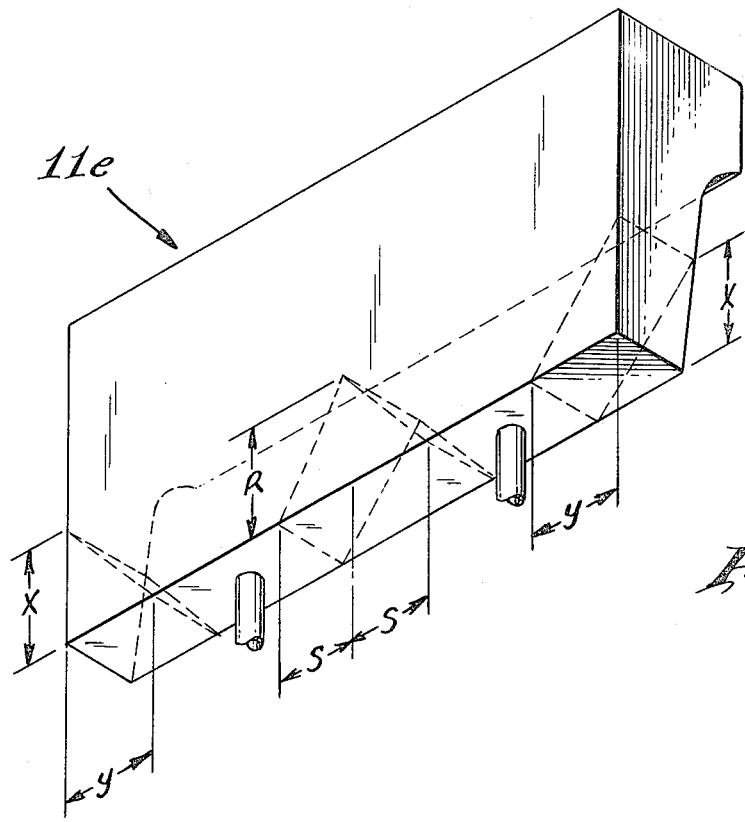
FIG. 7 is a schematic representation of a feed trough in accordance with the present invention and certain dimensions thereof.

In FIG. 1, there is schematically represented a longitudinal sectional view of an apparatus in accordance with and suitable for the practice of the present invention generally designated by the reference numeral 10. The apparatus 10 comprises a feed or dispensing trough 11. The feed trough 11 has an upper open end 13 and a second or closed end 14. At the closed end 14 is shown a first reactive material source 15 and a flow diverting or deflector means 16. The trough 11 has a delivery lip 18 and a side guide lip 19. Adjacent the guide lip 19 is a generally horizontally disposed idler roll 21. Adjacent the idler roll 21 is a source of flexible sheet 22 such as a roll of kraft paper. A flexible sheet 23 such as kraft paper passes from the source 22 over the idler roll 21 and beneath the lip 18 to have deposited thereon a reactive hardening foaming material 24. Adjacent the idler roll 21 is a source 26 of flexible sheet 27. The source 26 and a like source not shown dispense flexible sheet 27 and a like sheet not shown, which in combination with the sheet 24 form a generally rectangular open topped moving trough 28. A support plate 31 is disposed adjacent the idler roll 21 beneath the sheet 23 and remote from the trough 11. The support plate 31 is generally downwardly sloping from the region of the lip 18 to a location remote from the trough 11. Beneath the plate 31 is a first conveyor roll 33 and remote from the plate 31 is a second conveyor roll 34. An endless conveyor or belt 35 passes over the rolls 33 and 34 and is supported by a support plate 36 at a location generally adjacent the flexible sheet 23. The plate 36 and belt 35 are generally parallel to the flexible sheet 27 and serve to receive the sheet 27 and like sheet not shown in the configuration of a rectangular open topped trough. The foam material progresses in the direction indicated by the arrow and forms a cured foam 24a at a location generally adjacent the roll 34.

In FIG. 2 there is schematically represented a sectional view of the trough 11 of FIG. 1 taken along the line 2—2 thereof. The trough 11 has disposed therein a first or side flow diverting means 16 and a second side flow diverting means 16a. The trough 11 has a second foamable material inlet 15a in generally spaced relationship to the inlet 15 passing through the bottom 14 of the trough 11. A central flow diverting means 16b is disposed generally between the material inlets 15 and 15a.

In operation of the apparatus 10 of FIGS. 1 and 2, hardenable foamable foam forming material such as a polyurethane foam forming composition is passed through the inlets or supply means 15 and 15a into the interior 16 of the trough 11. Within the trough 11 the material foams, passes upwardly to the first end 13 of the trough 11, flows over the lip 18, passes on to the flexible sheet 23 which is disposed between flexible sheet 27 and a like oppositely disposed sheet not shown. As the flexible sheets 23 and 27 proceed in the direction of the arrow, the foaming material 24 continues to foam, and hardens into a finished foam 24a. The foam and associated flexible sheets 23, 27 and one not shown, are forwarded by the conveyor consisting of elements 33, 34, 35 and 36.

In FIG. 3 there is schematically depicted a section of a foaming trough designated by the reference numeral 11a. The foaming trough 11a has a first or open end 13a, a lower end 14a and material inlets or sources 15b and 15c. The trough 11a is of essentially an identical configuration to the trough 11 with the exception that the trough 11 has flow diverters 16, 16a and 16b disposed therein.

A comparison of an apparatus generally of the configuration 10 employing troughs such as that of FIG. 2 in accordance with the present invention and FIG. 3 in accordance with the prior art indicated that temperatures measured on the rear surface remote from the rolls 21, 22 and the lip 18 were substantially more uniform employing a trough generally in accordance with FIG. 2 than were obtained when employed in accordance with the prior art indicated in FIG. 3.

Employing the trough of FIG. 2 in accordance with the present invention, a substantially improved cross sectional configuration of the foam 24a is obtained. Splits, surface defects, surface cavities and like deformations were significantly and substantially reduced when compared to foam prepared using a trough in accordance with the prior art as shown in FIG. 3.

In FIG. 4 there is schematically depicted a view of a trough 11b of generally similar construction to the trough 11 of FIGS. 1 and 2 wherein the distance from a lip corresponding to the lip 18 to the bottom of the trough has been designated as $L_1$. The distance from the inlet 15e has been designated $L_2$ and the distance from the inlet 15e to the bottom center of the trough as $L_3$. The troughs as hereinbefore and hereinafter depicted are assumed to be symmetrical about a plane passing through a centerline which is perpendicular to the bottom of the trough and contained in a plane passing normally through the center of the back of the trough.

In FIG. 5 there is depicted an alternate variety of trough designated by 11c. The trough 11c has an upper end 13c and a lower end 14c and inlets 15f and 15g disposed in the bottom of the trough. The inlets 15f and 15g pass into a minor trough 41 which communicates fully with the interior of the trough 11c. The trough 11c has a side member generally designated by the reference numeral 42. The distance $L_2$ is the distance between an end of trough 41 and adjacent side 42, the minor trough 41 being generally centrally symmetrically disposed within the bottom of the trough 11c.

In FIG. 6 there is depicted a trough 11d of generally similar configuration to the trough 11, 11b and 11c, but with the exception that the bottom 14d has no inlets. A pair of downwardly dependent inlet members 15h and 15i project into the trough 11d and terminate at a location adjacent the bottom 14d. The distance of the discharge of 15i from the adjacent side is designated as $L_2$ and the distance of the discharge of the inlet conduit from the centerline is designated as $L_3$.

In FIG. 7 there is depicted a trough 11e of generally similar configuration to that of trough 11 wherein the vertical dimension of diverter 16b is designated as R.

When one or more feed points to the trough are used, and these have approximate symmetry with the centerline of the trough, there is a region that starts at the edge of the feed inlet and goes to the side of the trough. This region occurs twice in any given trough and is referred to as the "side region." When two or more feed points are used, there is a region that starts at the edge of an inlet and continues to the nearest edge of the first adjacent inlet. This region may occur once or more, and all are referred to as the "middle region."

The "side region" is modified by eliminating some trough volume, starting at the bottom corner (see FIG. 4 and FIG. 7). The lower limits are that X is greater than $1/5\ L_1$ and Y is greater than $1/5\ L_2$ for any case. X and Y are less than or equal to $L_1$ and $L_2$, respectively. Further $X/L_1$ plus $Y/L_2$ should be equal to or less than 1.5 for a practical configuration.

Example:
$X/L_1 = \frac{1}{3}$
$Y/L_2 = \frac{2}{3}$

The "middle region" is modified by eliminating some trough volume, starting at the bottom center of the trough (see FIG. 4 and FIG. 7). The lower limits are $R/L \geq 1/5$ and $S/L_3 \geq 1/5$. R is less than $\frac{3}{8}\ L_1$ and S is less than or equal to $L_3$ in any case. Further, $R/L_1$ plus $S/L_3$ are equal to or less than 1.5.

Figure 8:
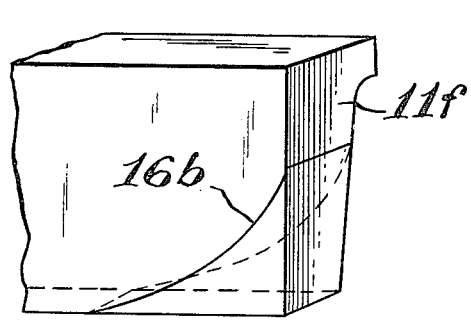
FIGS. 8, 9 and 10 depict fractional views of feed troughs in accordance with the present invention.
Figure 9:
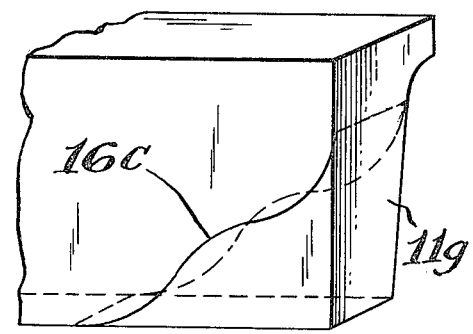
Figure 10:
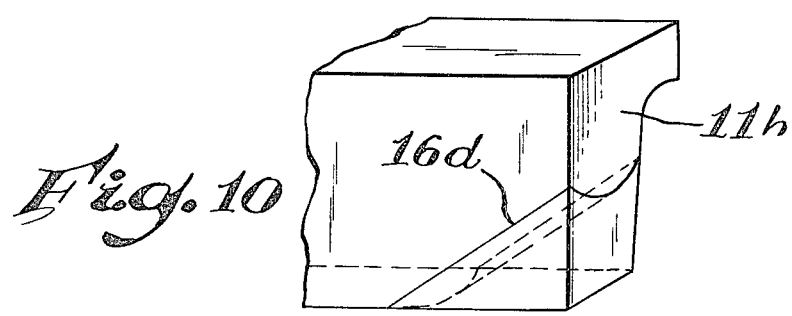

FIGS. 8, 9 and 10 show trough portions 11f, 11g and 11h respectively which depict flow diverter configurations 16b, 16c and 16d which are also useful in the practice of the present invention and closely approximate the flow configuration results obtainable with the generally simpler planar baffle or diverter configurations previously described. The choice of the configuration depends upon the quality of the desired foam product and materials which are conveniently available to form the desired flow converters and any particular resin formulation employed.

Figure 11:
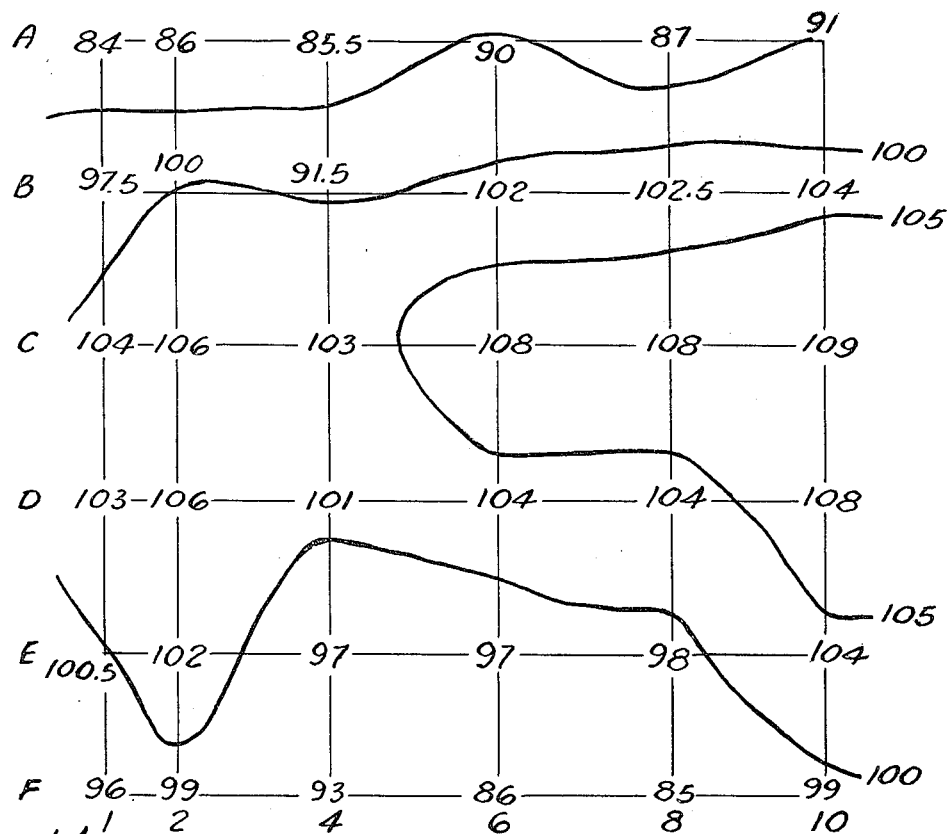
FIG. 11 is a plot of temperature during the foam preparation obtained employing a feed trough generally as depicted in FIG. 3.

FIG. 11 is a representation of temperatures recorded in degrees centigrade on one-half of the rear surface of a trough generally in accordance with the configuration of FIG. 3. Such temperatures were recorded over a period of about 4 minutes during foaming of a polyurethane foam of unknown feed formulation. The irregular curved lines are an estimate of lines of equal temperature as estimated from the temperatures recorded from the grid-like distribution of thermocouples. The temperatures were recorded at about ½ hour after initiation of foaming in the foaming apparatus which was generally in accordance with the configuration depicted in FIG. 1 employing a trough of the configuration of FIG. 3.

Figure 12:
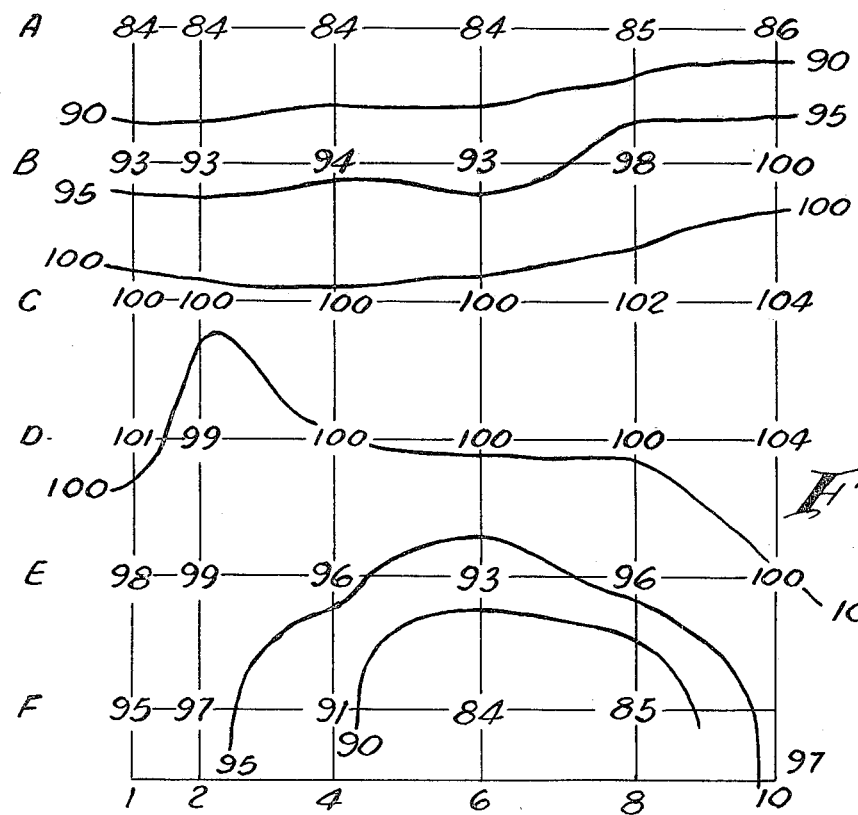
FIG. 12 is a representation of temperatures obtained employing a feed trough such as generally represented in FIG. 2.

FIG. 12 is a similar record of temperatures taken which are after initiation of foaming in the same apparatus using the same trough but after the insertion of flow diverters corresponding in general to the configuration of the diverters 16, 16a and 16b of FIG. 2.

FIGS. 11 and 12 depict the temperature gradient on the left-hand rear half of the trough. The vertical line generally designated by numeral 10 is generally the center line of the trough and that indicated by numeral 1 is the left-hand edge of the trough as viewed from the rear.

A critical portion of the temperature diagram is the temperatures on the line A which represent the temperatures of the foaming material at the top of the trough prior to being discharged therefrom. Note that the temperatures on reference line A of FIG. 12 range from 84° to 86° C. whereas the temperatures on line A of FIG. 11 vary from 84° to 91° C.

The product obtained employing the trough generally in accordance with FIG. 2 and exhibiting the temperature pattern of FIG. 12 was very uniform. By way of comparison, the product obtained using the trough of FIG. 3 and the temperature pattern of FIG. 11 provides foam of a similar significantly generally rectangular cross section than was obtained with the trough of FIG. 2, and substantial splits and nonuniformities were observed in the peripheral portion of the resultant billet.

Although the foregoing has been primarily described in terms of a two-inlet trough, the principle of the present invention is readily applicable to troughs having three or more inlets as well as a trough having a single inlet. In order to obtain foam of prime quality, the temperature of the foam material within the trough prior to deposition on the conveying trough formed from flexible sheets should be as uniform as is reasonably possible. The flow diverters suitable for use in such troughs are readily prepared from a wide variety of materials, for example, polyurethane itself. Polyurethane itself is particularly convenient in that if manipulated rapidly the ultimate shape of the baffle or flow diverter required can be obtained by sequentially measuring temperatures and altering the shape of the baffle. Sheet material is eminently suitable such as sheet polytetrafluoroethylene and the like. Such flow diverters are usually readily affixed within foaming troughs by means of adhesives such as epoxy resins, sheet metal screws and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of flexible polyurethane foam wherein a urethane foam forming mixture is provided, passing said mixture to a dispensing trough wherein partial foaming takes place, the dispensing trough discharging to a moving trough wherein the foam forming mixture expands and cures to form a flexible polyurethane foam, the improvement which comprises providing means for maintaining a generally uniform temperature across the mixture as the mixture passes from the dispensing trough to the moving trough wherein the generally uniform temperature is obtained by altering the internal configuration of the dispensing trough.

2. The method of claim 1 wherein the dispensing trough is generally rectangular and the configuration of the trough is altered by providing inserts generally adjacent the bottom thereof.

3. A method for the preparation of flexible polyurethane foam wherein a urethane foam forming mixture is provided passing said mixture to a dispensing trough wherein partial foaming takes place, the dispensing trough discharging to a moving trough wherein the foam forming mixture expands and cures to form a flexible polyurethane foam wherein the dispensing trough has two inlets generally adjacent the bottom of the trough in spaced apart relationship and means to maintain a generally uniform temperature across the mixture as the mixture passes from the dispensing trough to the moving trough wherein a generally uniform temperature is obtained within a generally rectangular dispensing trough by providing inlets generally adjacent the bottom of the trough and a center flow deflector disposed between the inlets.

4. An apparatus for the preparation of flexible polyurethane foam, the apparatus comprising in cooperative combination means to supply a foamable foam forming mixture of polyurethane components to a dispensing trough wherein the foam forming mixture partially foams and is discharged to an open topped moving trough wherein the forming mixture foams and cures to a flexible polyurethane foam, the improvement which comprises a means within the dispensing trough to provide a generally uniform temperature along a cross sectional configuration of the foaming mixture as the mixture passes to the moving trough.

5. The apparatus of claim 4 wherein the dispensing trough has a generally rectangular configuration.

6. The apparatus of claim 5 wherein the trough has at least two inlets for providing the polyurethane foam forming mixture.

7. An apparatus for the preparation of flexible polyurethane foam, the apparatus comprising in cooperative combination means to supply a foam forming mixture of polyurethane components to a dispensing trough wherein the foam forming mixture partially foams and is discharged to an open topped moving trough wherein the foaming mixture foams and cures to a flexible polyurethane foam, means disposed within the dispensing trough to provide a generally uniform temperature along a cross sectional configuration of the foaming mixture as the mixture passes to the moving trough wherein the means within the trough is at least two side flow deflectors disposed within the trough at a location generally adjacent the bottom thereof.

8. An apparatus for the preparation of flexible polyurethane foam, the apparatus comprising in cooperative combination means to supply a foam forming mixture of polyurethane components to a dispensing trough wherein the foam forming mixture partially foams and is discharged to an open topped moving trough wherein the foaming mixture foams and cures to a flexible polyurethane foam, means disposed within the dispensing trough to provide a generally uniform temperature along a cross sectional configuration of the foaming mixture as the mixture passes to the moving trough wherein the means within the trough is at least two side flow deflectors disposed within the trough at a location generally adjacent the bottom thereof, and a centrally disposed flow deflector generally adjacent the bottom of the trough disposed between at least two inlets providing the polyurethane foam forming mixture.

* * * * *